United States Patent [19]
Sink

[11] Patent Number: 5,511,886
[45] Date of Patent: Apr. 30, 1996

[54] BEARING SEAL WITH OIL DEFLECTORS

[75] Inventor: Danny R. Sink, Chester, Va.

[73] Assignee: Brenco Incorporated, Petersburg, Va.

[21] Appl. No.: 247,842

[22] Filed: May 23, 1994

[51] Int. Cl.$^6$ .......................... F16C 33/76; B61F 15/22; F16J 15/54
[52] U.S. Cl. .......................... 384/486; 277/134
[58] Field of Search .......................... 384/486; 277/134

[56] References Cited

U.S. PATENT DOCUMENTS

| | | | |
|---|---|---|---|
| 3,515,395 | 6/1970 | Weinand | 277/134 |
| 3,962,776 | 6/1976 | Mikami | 277/134 X |
| 4,336,945 | 6/1982 | Christiansen et al. | 277/153 |
| 4,350,347 | 9/1982 | Heinrich | 277/153 |
| 4,447,064 | 5/1984 | Ehrmann et al. | 277/134 |
| 4,770,548 | 9/1988 | Otto | 384/478 |
| 4,783,086 | 11/1988 | Bras et al. | 277/134 |
| 4,808,012 | 2/1989 | Otto | 384/482 |
| 4,871,949 | 4/1989 | Otto | 277/29 |
| 5,024,449 | 6/1991 | Otto | 277/37 |
| 5,186,548 | 2/1993 | Sink | 384/486 |

FOREIGN PATENT DOCUMENTS

| | | | |
|---|---|---|---|
| 1916214 | 3/1969 | Germany. | |
| 1219569 | 1/1971 | United Kingdom | 277/134 |

*Primary Examiner*—John Q. Nguyen
*Attorney, Agent, or Firm*—Kerkam, Stowell, Kondracki & Clarke; Edward J. Kondracki

[57] ABSTRACT

A radial seal assembly for sealing a lubricant-containing bearing cavity in an anti-friction bearing includes a rigid annular ring mounted in a cylindrical bore of the outer bearing case and a resilient sealing body bonded onto the ring and engaging an outwardly directed cylindrical sealing surface supported for rotation relative to and coaxially with the cylindrical bore in the bearing case. The seal body includes an outer dust seal lip engaging the sealing surface and a primary lubricant seal lip forming a dynamic seal with the sealing surface. The primary seal lip has a generally conical surface on the side thereof directed toward the bearing cavity, and a plurality of oil deflectors are integrally formed on and project from the conical surface within the annular space between the conical surface and the sealing surface, with the respective oil deflectors having leading and trailing surfaces inclined with respect to the direction of relative rotation.

21 Claims, 3 Drawing Sheets

BEARING SEAL WITH OIL DEFLECTORS

BACKGROUND OF THE INVENTION

1. Field of the Invention

This invention relates to bearing shaft seals and more particularly to such seals including an elastomeric seal element carried on a rigid seal body and having an improved lubricant sealing portion and a dust sealing portion spaced axially from the lubricant sealing portion.

2. Description of the Prior Art

It is well known to provide lubricant seals between a shaft and a cylindrical bore in a housing within which the shaft is supported for relative rotation. Such seals typically consist of a rigid support ring or body adapted to fit in fluid tight relation with the cylindrical bore and support a resilient elastomeric or rubber-like sealing element in fluid tight contact with the outer cylindrical surface of the relatively rotating shaft, or with a cylindrical surface on a wear ring, inner bearing race or other member supported on the shaft. Examples of such seals are shown in U.S. Pat. Nos. 5,292, 199; 4,747,603 and 4,278,261. When seals of this type are operated in an environment where foreign matter such as dust, mud, water or other contaminants (hereinafter, dust) may contact the outer surface of the resilient sealing element, it is common practice to provide a secondary seal lip, usually referred to as a dust or auxiliary lip, in an attempt to prevent the ingress of such dust into the sealed area. The resilient sealing element is out of contact with the cylindrical sealed surface between the primary and dust sealing lips, providing an annular void ring between the two lips. A seal of this type is illustrated, for example, in my U.S. Pat. No. 5,186,548.

As pointed out in U.S. Pat. No. 4,336,945, seals of this type generally employ a so-called hydrodynamic or pumping surface contour in association with the primary lubricant sealing lip. Lubricant leaking past the primary sealing lip into the annular void tends to be urged back into the sealed area by the hydrodynamic surface. Some minimal leakage is desirable, however, to provide cooling and lubrication for the primary sealing lip and for the dust seal. At the same time, excessive leakage can occur as when the bearing and seal are subjected to heavy vibration loads or axial shifting, and excessive leakage past the primary seal lip can result in leakage past the dust seal and loss of lubricant which may ultimately lead to premature wear and/or overheating of the seal and bearing.

U.S. Pat. No. 4,770,548 discloses a hydrodynamic shaft seal in Which the primary seal is provided by a generally cylindrical sealing surface disposed closely adjacent to the shaft to be sealed, and vents are provided in the sealing surface at spaced intervals around its periphery. The vents are generally wedge or pyramid-shaped cut-outs having an enlarged end opening into the sealed cavity with the walls tapering toward a small opening in the opposite edge of the seal lip. The small openings are designed to permit the escape of lubricant past the primary seal lips to relieve pressure in the sealed bearing.

In an effort to limit the amount of lubrication in the vicinity of the primary seal lip on the side facing the sealed area of the bearing (the oil side) during operation, it has been known to provide lubricant deflectors integrally formed on the oil side of the seal. One such arrangement is illustrated in U.S. Pat. No. 4,447,064 wherein a plurality of scoop-like deflector blades are integrally formed on the conical surface of the primary seal, with the radial inner edge of the deflectors acting as knife edges spaced slightly from the surface of the relatively rotating shaft to shear or peel off excess lubricant adhering to the relatively rotating shaft surface. This arrangement theoretically leaves a film of lubricant on the shaft surface to migrate axially to the sealing lip for cooling and lubricating purposes. The inertia and/or centrifugal force of the oil engaging the curved vane-like surfaces of the deflector blades apparently urges or impels the lubricant outwardly along the conical surface of the seal and back into the sealed bearing area radially outward of and axially spaced from the primary seal lip. In practice, however, it has been found that these relatively rigid, axially extending projections or vanes can produce sufficient turbulence in the lubricant to generate heat in the area of the heat sensitive sealing lip with the net result that such vanes may under some circumstances aggravate the condition which they are intended to alleviate. Further, the complex configuration of the resilient member embodying these vane type lubricant shearing deflectors make them difficult to mold and the necessary close tolerances are difficult to achieve.

U.S. Pat. No. 4,808,012 discloses a seal for an anti-friction bearing in which the seal element is formed with a plurality of flaps, or wing-like flexible projections extending from the seal body into or toward the oil side, with these flaps being dimensioned to be deflected by movement of the lubricant relative to the flaps to deflect the lubricant away from the seal. The above-mentioned U.S. Pat. No. 4,447,064 describes a similar arrangement as being illustrated in German Patent Publication DE-OS 1,916,214, with the exception that in this German publication, the flaps are stated to bear directly against and be deformed by the relatively moving shaft surface in the direction to deflect liquid lubricant away from the seal. A primary defect of the seal disclosed in the German patent document is described in said U.S. patent. Another shortcoming is that, for such fins or flaps to be effectively deflected by the light rubbing contact with the shaft, they must be in the form of very thin sheets which presents a severe molding problem.

U.S. Pat. No. 4,350,347 discloses a radial shaft seal in which the seal body is provided with an uneven contour on the oil side surface adjacent the primary seal lip for the purpose of presenting greater surface exposure to the lubricant body to improve the heat transfer between the seal and lubricant to thereby prevent seal overheating. Again, the contours shown can increase turbulence and actually generate heat in the lubricant. There is no suggestion of effectively deflecting excess lubricant from the vicinity of the primary seal lip to improve the seal during operation.

It is, therefore, a primary object of the present invention to provide an improved bearing shaft seal assembly incorporating lubricant deflectors on the oil side of the seal which avoids the drawbacks of the known prior art seals.

Another object is to provide such an improved bearing shaft seal including lubricant deflectors integrally formed with the seal body on the oil side thereof at a location spaced from the sealed shaft.

Another object is to provide such an improved seal wherein the oil deflectors are bi-directional and are designed to produce minimum turbulence in the sealed lubricant while effectively deflecting lubricant from the primary seal lip to minimize leakage and yet provide adequate lubrication of the seal lip.

Another object is to provide such a seal assembly wherein the lubricant deflectors are easily and economically molded integrally with the primary seal body.

Another object is to provide such a seal assembly which is effective in preventing lubricant leakage with minimum or no contact pressure between the primary seal lip and the sealed shaft surface.

SUMMARY OF THE INVENTION

In the attainment of the foregoing and other objects, an important feature of the invention resides in providing a low friction seal including a primary lubricant seal lip and at least one dust seal lip, and improved lubricant deflectors integrally formed on the oil side of the primary seal lip for producing cavitation in the lubricant body effective to evacuate excess lubricant from the vicinity of the primary seal lip while avoiding excessive turbulence in the lubricant body during relative rotation between the seal and shaft. The deflectors are located on the conical surface of the seal body on the oil side of the primary seal lip at a location spaced a substantial distance from the shaft surface. The deflectors have leading and trailing edges, relative to the direction of rotation, which present an inclined plane or camming surface to lubricant coming into contact therewith during operation. The circumferential length of these camming surfaces is substantially greater than the axial extent thereof to effectively deflect lubricant axially while avoiding undesired or excessive turbulence in the lubricant. Preferably an axially extending circumferential ring or lip spaced radially outward from the deflectors cooperates with the deflectors to provide a cavitation area which minimizes contact of the lubricant body with the deflector surfaces. The inclined surface on the forward and leading edges of the deflectors also enables use of the seal as a bi-directional seal and minimizes turbulence by avoiding abrupt pressure changes.

BRIEF DESCRIPTION OF THE DRAWINGS

Other features and advantages of the invention will be apparent from the detailed description contained hereinbelow, taken in conjunction with the drawings, in which.

DESCRIPTION OF THE PREFERRED EMBODIMENTS

The improved seal assembly of the present invention is illustrated herein in connection with a low friction railcar wheel bearing assembly. It should be understood at the outset, however, that the seal is equally useful in other applications such as automotive wheel bearings, industrial shaft bearings, and the like, and that the reference to a railcar bearing is for convenience of description only.

Figure 1:
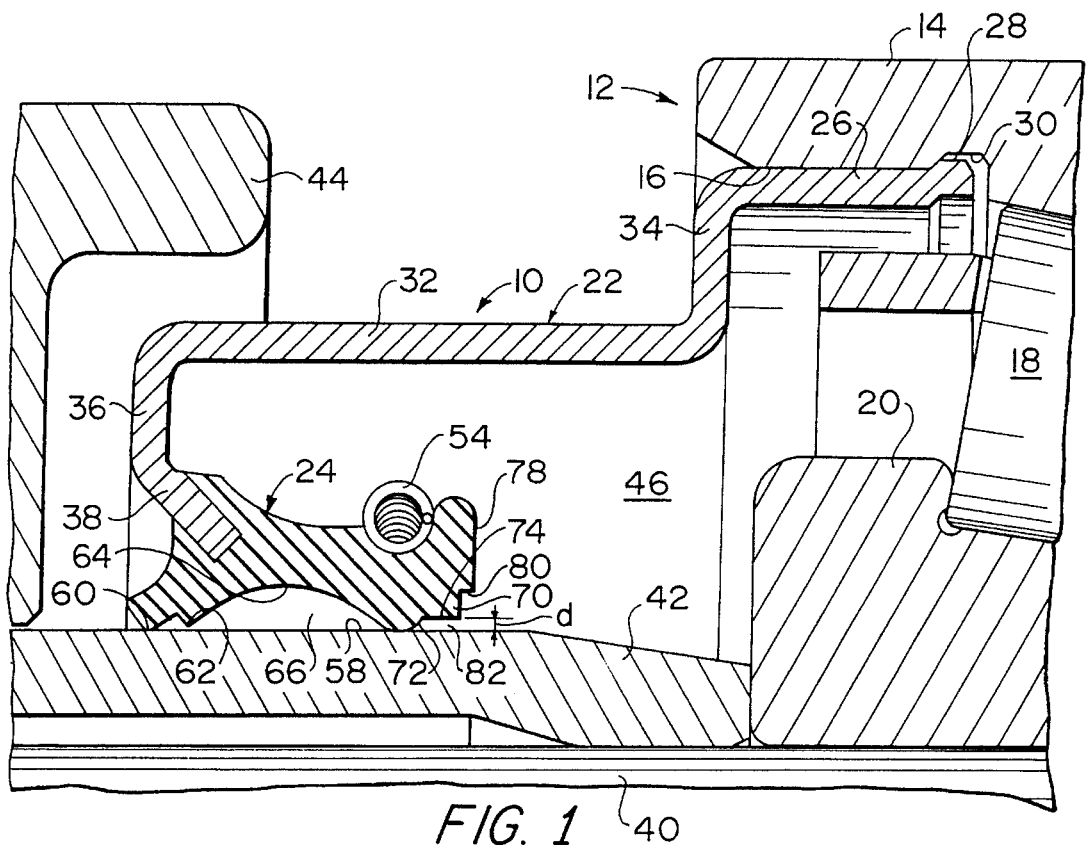
FIG. 1 is an enlarged fragmentary sectional view of a portion of a railcar wheel bearing and shaft embodying the improved seal of the present invention.

Referring now to the drawings in detail, the improved seal assembly, designated generally by the reference numeral 10, is shown assembled as a part of a prepackaged bearing assembly 12, only one end portion of which is shown in FIG. 1. The bearing assembly includes an outer housing or cup member 14 having a cylindrical recess 16 formed in each of its open ends for receiving the seal assembly 10, and provides outer races for the bearing elements 18 which, in turn, rotate on the bearing surface of inner race ring members 20.

The seal assembly 10 comprises a rigid support ring 22 having mounted on its radial inner periphery a resilient sealing element indicated generally at 24. Support ring 22 includes a large diameter open ended section 26 adapted to fit in sealing relation within the cylindrical bore 16 of cup 14. An enlarged retaining lip 28 formed on the end of cylindrical portion 26 is adapted to snap into an undercut groove 30 in the cylindrical bore 16 to retain the seal assembly on the bearing.

A smaller diameter cylindrical body portion 32 of support ring 22 extends outwardly from the bearing cup 14 and is joined to portion 26 by a radial segment 34. Ring 22 terminates at its end spaced from the cup 14 in an inwardly directed flange portion 36 having an inturned lip 38 for supporting the resilient seal element 24. Seal element 24 is molded on and is permanently bonded, or vulcanized, to the rigid metallic ring 22 in a manner well known in the art.

In FIG. 1, the bearing and seal assembly is supported on the cylindrical shaft or axle 40 of a railcar, and a wear ring or spacer element 42 engaging the end of the inner race element 20 axially fixes the bearing and seal on the shaft 40. A retaining cap 44 is rigidly mounted on the end of the shaft by means of bolts, not shown, with the cap 44 engaging the end of the wear ring 42 to firmly clamp the wear ring and the bearing inner races 20 on the shaft in the manner illustrated in the above-mentioned U.S. Pat. No. 4,336,945, with the wear ring 42 becoming, in effect, an integral part of the shaft. In this embodiment, the sealing element 24 contacts the outer cylindrical surface 58 of the wear ring 42 to provide the desired seal to maintain the lubricant within the bearing and the sealed space indicated generally at 46. It should be apparent, however, that the wear ring may be omitted and the seal formed directly between the sealing element 24 and the outer surface of shaft 42, or other cylindrical surface on a concentric relatively rotating component. Thus, the seal support ring and sealing element may be configured to provide a fluid seal with the outer cylindrical surface of the inner bearing member 20 when the seal is used, for example, in an automotive wheel bearing assembly.

The seal element 24 is preferably integrally molded from a single substantially homogeneous mass of elastomeric or rubber-like material of suitable density and hardness for the particular application as is known in the art. The seal body is a continuous annular ring having an inner primary lubricant sealing area at its axially inwardly directed free end spaced from the support lip 38 of support ring 22. The primary lubrication sealing area is defined by a lubricant sealing lip 50, and a contoured hydrodynamic surface is formed on the outwardly directed generally conical surface of lip 50, i.e., the surface opposite the sealed area 46, with this hydrodynamic or pumping surface being indicated by the surface contours 52. In the embodiment illustrated in FIGS. 1–3, an endless coil or garter spring 54 may be supported in an outwardly directed groove 56 radially outward from lip 50 to maintain a continuous controlled sealing pressure between the sealing lip 50 and the outer sealing surface 58 of wear ring 42. As explained more fully hereinbelow, this garter spring may be omitted in accordance with the present invention to enable a lighter contact or non-contacting seal to be formed between lip 50 and the surface 58.

At the end opposite sealing lip 50, the seal element 24 is provided with a dust seal, preferably in the form of a double dust lip seal of the type illustrated in my above-identified U.S. Pat. No. 5,186,548. In this preferred embodiment, the dust seal includes an outwardly directed primary dust seal lip 60 and an auxiliary, inwardly spaced outwardly directed secondary dust seal lip 62. Lip 60 is in continuous rubbing or sealing contact with the outer surface 58 of the wear ring 42 while lip 62 is spaced from the surface of ring 58, with this spacing being as small as practical within manufacturing tolerances and good molding practice. The seal body 24 has a concave inner surface 64 between the sealing lips 50 and 62 which, together with the outer surface 58 of the wear ring 42, defines an annular cavity or prelube chamber 66 when the seal is installed. This chamber 66 may be packed with a suitable lubricant prior to installing the seal whereby the seal is prelubricated in accordance with conventional practices.

The seal and bearing structure thus far described is known and in commercial use. In accordance with the present invention, a plurality of oil deflecting projections 70 are integrally molded on and project outward from the conical surface 72 on the oil side of primary seal lip 50. Projections 70 have a radially inwardly directed arcuate or planar surface 74 which is generally opposed to and spaced radially outward by a distance "d" from the cylindrical surface 58 of the shaft, wear ring, or other cylindrical surface to be sealed as seen in FIG. 1. Each projection 70 has an oil deflecting surface 76 which preferably is continuously curved and intersects the arcuate surface 74 and the generally conical surface 72. Surface 76 preferably is substantially perpendicular to surface 74, although molding practice may dictate that surface 76 be slightly coned or inclined. Surface 76 may be generally arcuate or curved so that surface 74 is generally a lune or crescent shaped surface. Surfaces 74 and 76 thus cooperate with the conical surface 72 to define a generally wedge or orange slice-shaped protrusion or projection extending from the conical surface 72, with the circumferential extent or length of the projections 70 measured along the line of intersection 77 of surfaces 72 and 74, being substantially greater than the distance from line 77 to surface 76 at its apex, i.e., the maximum axial extent of the surface 74 measured from line 77. This ratio should be at least about 3 to 1 and preferably from about 5 to 1 to about 8 to 1. Thus, the portion of surface 76 which faces the direction of relative rotation between the seal and shaft preferably will extend at least about twice as far in the circumferential direction as in the axial direction. As is also apparent from the drawings, the inner or free end surface 78 of the seal body 24 preferably extends axially past the lubricant deflecting projections 70 to provide an annular overhanging lip or ledge 80 so that the projections 70 are disposed in a ring-like cavity 82 defined by the sealed shaft surface 58, the conical surface 72, and the overhanging lip 80. Preferably projections 70 are contained within the annular space between the generally conical surface 72 and the outwardly directed cylindrical surface 58.

Figure 3:
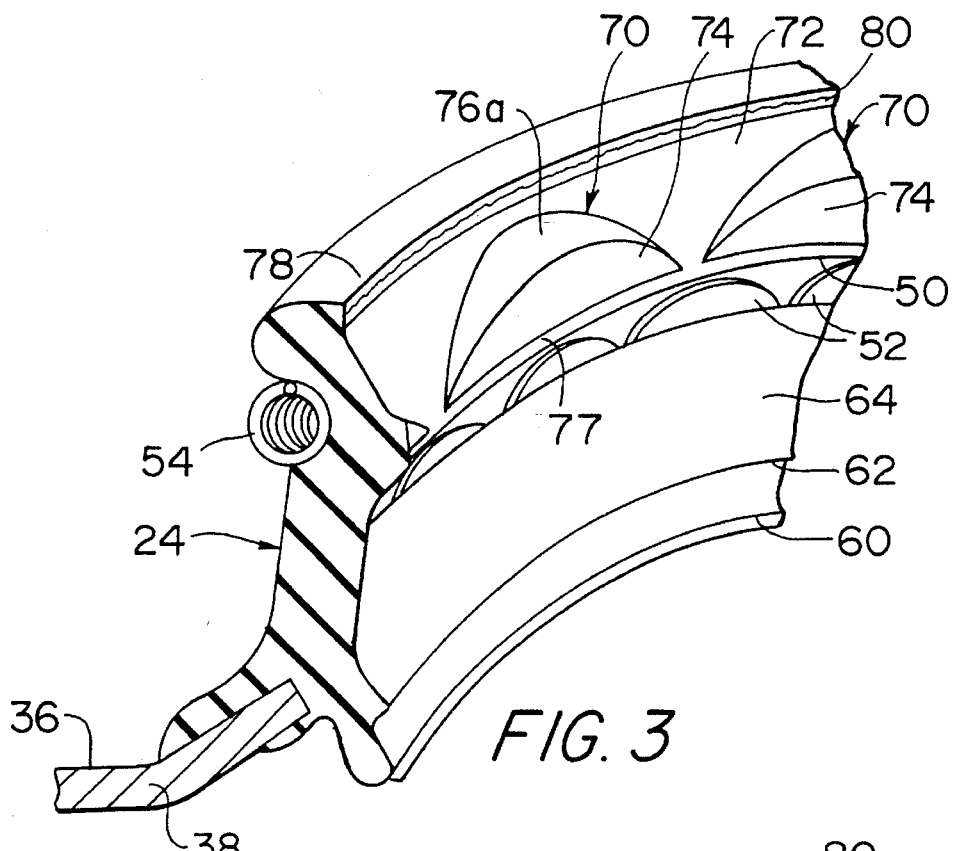
FIG. 3 is a fragmentary sectional view, partially in section, of a portion of the seal shown in FIGS. 1 and 2.

In operation of the improved seal according to the embodiment of the invention shown in FIG. 3, upon relative rotation between the shaft and seal lubricant disposed within the cavity 82 and in the vicinity of the deflecting projections 70 tends to rotate relative to the seal body as a result of inertia and fluid shear. This relative movement will result in the leading portion of surface 76 engaging and moving or deflecting the lubricant axially outward toward the seal cavity 46 beneath the ledge 80. At the same time, ledge 80 and conical surface 72 will minimize the tendency of lubricant which is located radially outward of the projections to migrate, or "fall" into direct contact with the surfaces 76 of the projections 70 to minimize the continuous recirculation or pumping action and consequent turbulence in the area of the primary seal as could result from the prior art seals discussed above. The contour of surface 76 produces a substantially smooth transition between the leading and trailing portions of the surface, thereby avoiding abrupt pressure changes and turbulence which can result from sharp edges or contour changes employed by the lubricant deflecting seals disclosed in the prior art patents discussed above.

It should be apparent from the symmetrical configuration of the deflecting projections 70 that the seal is hi-directional and will work equally well regardless of the direction of relative rotation between the seal body and the sealed shaft. While surface 76 is illustrated in FIG. 3 as a substantially continuous arcuate surface, other curved configurations may be used. Also, as shown in FIG. 5, two generally planar substantially triangular surfaces 76a and 76b, respectively extending from the leading and trailing ends and meeting at an apex 76c might also be employed.

Figure 2:
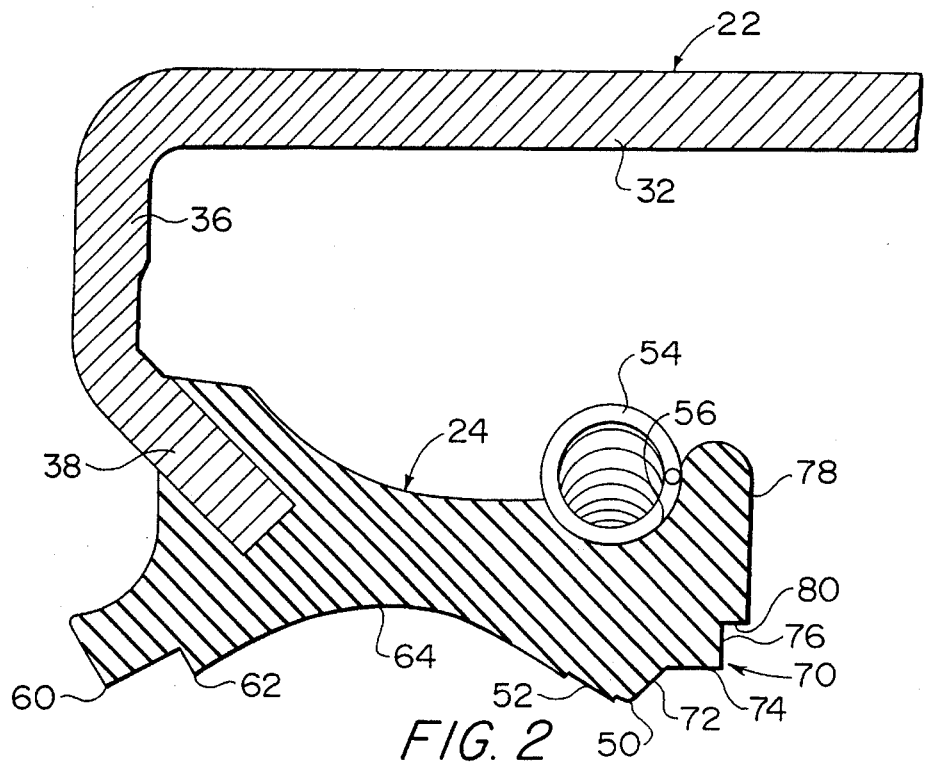
FIG. 2 is a further enlarged view of a portion of the seal structure shown in FIG. 1.

Tests conducted on the seal configuration illustrated in FIGS. 1–3 have shown that the smooth arcuate deflecting surface 76 produce effective cavitation in the lubricant within annular cavity 82 to effectively evacuate lubricant from this area and avoid the build-up of excessive pressure which could result in flow of lubricant outward past the primary seal lip 50. By minimizing leakage past the primary seal lip, the hydrodynamic surface contours 52 are able to return sufficient lubricant from cavity 66 so that pressure is not built up in this area and the tendency for leakage past the dust seal lip 60 is minimized. At the same time, the radial spacing between surface 74 and the sealed shaft is sufficient to avoid complete wiping of the lubricant from the relatively rotating shaft surface so that adequate lubricant is provided for the seal. In practice, it has been found that the spacing between surface 74 and the seal shaft for a railcar bearing seal is preferably within the range of about 0.008 and 0.015 inches, depending upon relative rotational speeds, lubricant viscosity, seal diameter and other factors. This spacing may also vary for other types of bearings such as automotive wheel bearings.

Tests have also shown that a seal embodying the present invention provides an effective seal without the use of the compressive forces applied by the conventional garter spring, and the invention is highly effective for use in low contact or no contact seals, especially when employed in combination with the double dust seal illustrated in the drawings which provides an adequate seal during static conditions.

Figure 4:
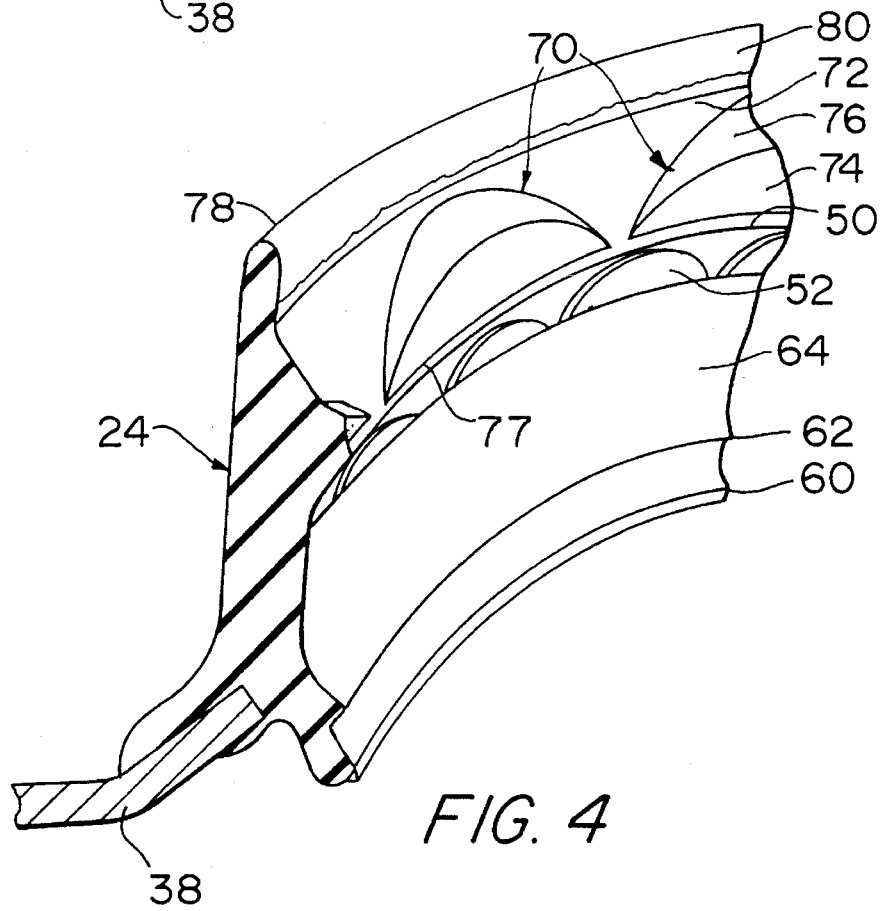
FIG. 4 is a view similar to FIG. 3 showing an alternate embodiment of the seal structure.
Figure 5:
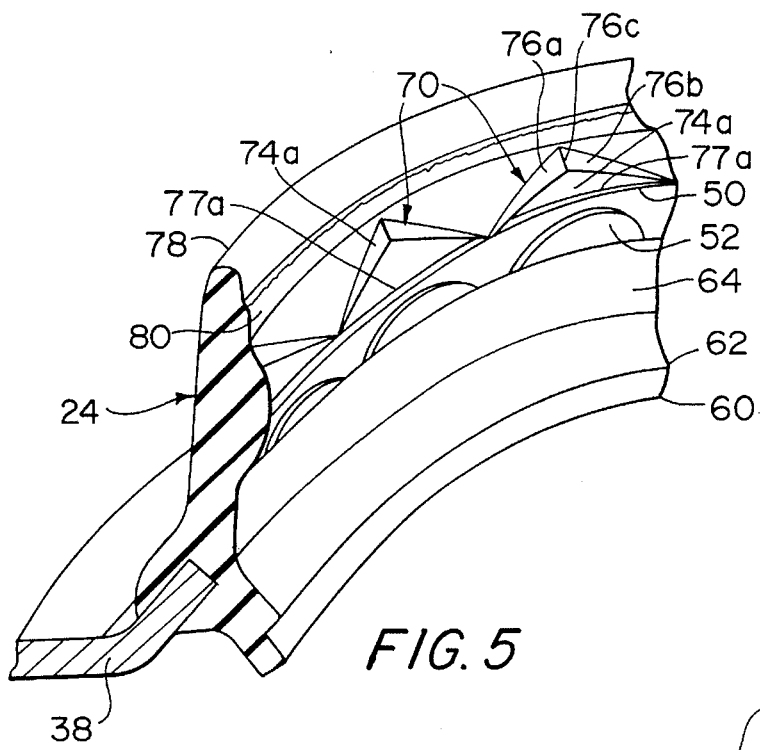
FIG. 5 is a view similar to FIG. 4 showing a further embodiment of the invention.
Figure 6:
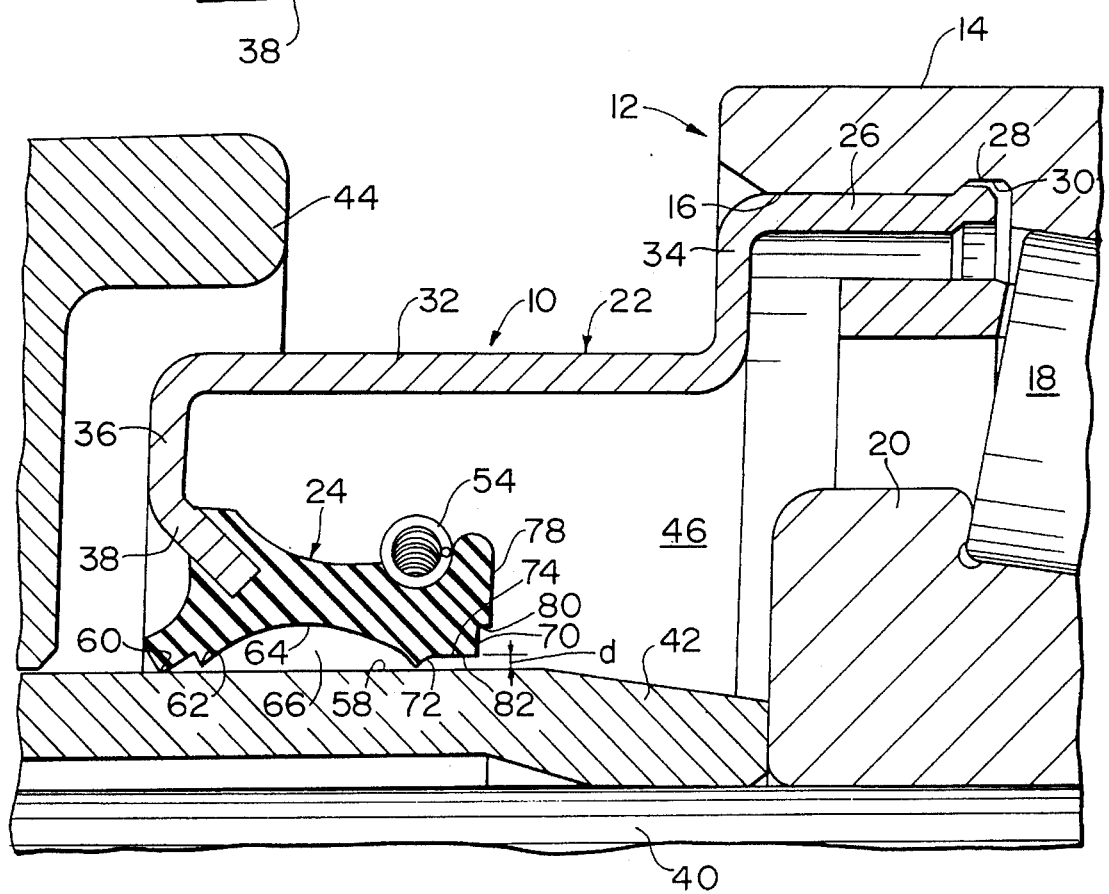
FIG. 6 is a view similar to FIG. 1 and illustrating a non-contact primary sealing lip.

FIGS. 4 and 5 illustrate the invention incorporated in a low contact or non-contact seal. Except for the elimination of the garter spring 54 and groove 56, the FIG. 4 embodiment is similar to that described with reference to FIG. 3, and like reference numerals are employed in FIGS. 3 and 4 to illustrate like structure. Also, in the FIG. 4 embodiment the overhanging ledge 80 is extended further into the sealed cavity 46, providing an increased volume within the annular chamber 82 defined by the ledge 80, conical surface 72, and the sealed shaft member.

In the embodiment of the invention shown in FIG. 5, the lubricant deflector projections 70a are illustrated as being substantially shorter, in the circumferential direction, than the projections 70 of FIGS. 3 and 4. Also, the generally axially directed oil deflecting surface of the projections 70a is made up of leading and trailing, substantially planar, generally triangular-shaped surface segments 76a and 76b, respectively, which surface segments intersect at an apex 76c. In this configuration, the radially inwardly directed surface 74a is a generally triangular surface in projection. The axial distance from the apex 76c to the base 77a is exaggerated in FIG. 5 to more clearly disclose the generally triangular, planar configurations of surface segments 76a and 76b, it being understood that the ratio of the circumferential to axial measurements of the projections are preferably as stated hereinabove with respect to surface 76. The included angle between surface 76a and 76b should be such as to provide a relatively smooth transition from the leading to the trailing surfaces to thereby reduce turbulence in the lubricant displaced.

For a low contact, or low pressure seal, the internal diameter of the primary seal lip 50 should be within the range of about 0.002 to about 0.008 inches smaller than the external diameter of the cylindrical surface to be sealed. Ideally, in such a low contact seal embodiment, the diameters are as close as possible while maintaining continuous rubbing contact during relative rotation, and the range quoted is considered to be within achievable manufacturing tolerances while assuring such continuous contact. For a no contact seal, the diameter of seal lip 50 would preferably be within the range of about 0.002 to about 0.008 inches greater than the diameter of the shaft to be sealed. Again, the difference would ideally be as small as possible, and the range quoted is considered to be within the achievable range of manufacturing tolerances.

While I have disclosed and described preferred embodiments of my invention, I wish it understood that I do not intend to be restricted solely thereto, but rather I intend to include all embodiments which would be apparent to one skilled in the art and which come within the spirit and scope of my invention.

I claim:

1. In combination with an anti-friction bearing assembly including coaxial inner and outer relatively rotating bearing components defining a sealed lubricant-containing cavity therebetween, a radial sealing assembly for sealing the cavity, the sealing assembly including a rigid support ring having a generally cylindrical body portion adapted to fit within and form a lubricant-tight seal with a radially inwardly directed cylindrical bore in the outer bearing component and a resilient ring-shaped sealing body mounted on the support ring in position to form a lubricant seal with a radially outwardly directed cylindrical surface coaxial with and relatively rotating with respect to said cylindrical bore, the sealing body including a dust sealing lip adapted to contact and form a dust seal with said radially outwardly directed cylindrical surface and a primary sealing lip forming a lubricant seal with said radially outwardly directed cylindrical surface, said primary sealing lip comprising, a generally frustoconical surface directly facing the sealed lubricant-containing cavity, a plurality of generally wedge-shaped oil deflectors integrally formed on and projecting from said generally frustoconical surface into said sealed lubricant-containing cavity, said oil deflectors being arranged in an annular ring around said primary sealing lip, each said deflector being defined by a first surface extending in radially outwardly spaced generally opposed relation to said radially outwardly directed cylindrical surface and intersecting said generally frustoconical surface along a first line, and an oil deflecting surface intersecting said first surface and said generally frustoconical surface, each said oil deflecting surface including a leading and a trailing surface portion each inclined axially relative to the direction of relative rotation of said inner and outer bearing components from an apex spaced axially from said first line to a point of intersection with said first line.

2. The sealing assembly defined in claim 1 wherein the length of each said oil deflectors measured along said first line is at least about three times the axial distance from said apex to said first line.

3. The sealing assembly defined in claim 1 wherein the length of each said oil deflectors measured along said first line is within the range of about three to about eight times the axial distance from said apex to said first line.

4. The sealing assembly defined in claim 1 wherein said oil deflectors are confined within the space between said generally frustoconical surface and said radially outwardly directed cylindrical surface.

5. The sealing assembly defined in claim 1 wherein said oil deflecting surface is a continuously curved surface containing said leading and said trailing surface portions.

6. The sealing assembly defined in claim 5 wherein said continuously curved surface is a generally arcuate surface.

7. The sealing assembly defined in claim 6 wherein said oil deflectors are confined within the space between said generally frustoconical surface and said radially outwardly directed cylindrical surface.

8. The sealing assembly defined in claim 7 wherein the length of each said oil deflectors measured along said first line is at least about three times the axial distance from said apex to said first line.

9. The sealing assembly defined in claim 7 wherein the length of each said oil deflectors measured along said first line is within the range of about three to about eight times the axial distance from said apex to said first line.

10. The sealing assembly defined in claim 1 wherein said oil deflecting surface is in the form of two generally planar substantially triangular surface portions intersecting at said apex.

11. The sealing assembly defined in claim 10 wherein said oil deflectors are confined within the space between said generally frustoconical surface and said radially outwardly directed cylindrical surface.

12. The sealing assembly defined in claim 11 wherein the length of each said oil deflectors measured along said first line is within the range of about three to about eight times the axial distance from said apex to said first line.

13. The sealing assembly defined in claim 1 further comprising an annular ledge integrally formed on said sealing body and projecting axially from said generally frustoconical surface into said sealed lubricant-containing cavity at a location radially outward from said oil deflectors.

14. The sealing assembly defined in claim 13 wherein said oil deflectors are confined within the space between said generally frustoconical surface and said radially outwardly directed cylindrical surface.

15. The sealing assembly defined in claim 14 wherein the length of each said oil deflectors measured along said first line is within the range of about three to about eight times the axial distance from said apex to said first line.

16. The sealing assembly defined in claim 15 wherein each said oil deflecting surface is a continuously curved surface.

17. The sealing assembly defined in claim 13 wherein each said oil deflecting surface is in the form of two generally planar substantially triangular surface portions intersecting at said apex.

18. The sealing assembly defined in claim 17 wherein said oil deflectors are confined within the space between said generally frustoconical surface and said radially outwardly directed cylindrical surface.

19. The sealing assembly defined in claim 18 wherein the length of each said oil deflectors measured along said first line is within the range of about three to about eight times the axial distance from said apex to said first line.

20. The sealing assembly defined in claim 1 wherein said primary sealing lip forms a low contact seal with said radially outwardly directed cylindrical surface.

21. The sealing assembly defined in claim 1 wherein said primary sealing lip forms a non-contact seal with said radially outwardly directed cylindrical surface.

* * * * *